US008056080B2

(12) United States Patent
Alexander et al.

(10) Patent No.: US 8,056,080 B2
(45) Date of Patent: Nov. 8, 2011

(54) MULTI-CORE/THREAD WORK-GROUP COMPUTATION SCHEDULER

(75) Inventors: Benjamin G. Alexander, Austin, TX (US); Gregory H. Bellows, Austin, TX (US); Joaquin Madruga, Austin, TX (US); Brian D. Watt, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 12/551,515

(22) Filed: Aug. 31, 2009

(65) Prior Publication Data

US 2011/0055839 A1    Mar. 3, 2011

(51) Int. Cl.
*G06F 9/46* (2006.01)
*G06F 15/00* (2006.01)
*G06T 15/00* (2011.01)

(52) U.S. Cl. ........ 718/102; 718/103; 718/104; 345/522; 712/28; 712/200; 712/215; 712/220

(58) Field of Classification Search .................... 718/102
See application file for complete search history.

(56) References Cited

U.S. PATENT DOCUMENTS

| 5,506,999 | A |   | 4/1996 | Skillman et al. |  |
|---|---|---|---|---|---|
| 6,075,546 | A | * | 6/2000 | Hussain et al. | 345/522 |
| 6,662,203 | B1 | * | 12/2003 | Kling et al. | 718/103 |
| 7,246,353 | B2 |   | 7/2007 | Forin et al. |  |
| 7,376,693 | B2 |   | 5/2008 | Neiman et al. |  |
| 7,385,607 | B2 | * | 6/2008 | Bastos et al. | 345/502 |
| 7,439,949 | B2 | * | 10/2008 | Shikina et al. | 345/107 |
| 7,533,382 | B2 |   | 5/2009 | Karim |  |
| 7,542,042 | B1 | * | 6/2009 | Allen et al. | 345/506 |
| 2004/0003019 | A1 | * | 1/2004 | Ali-Santosa et al. | 709/100 |
| 2007/0030278 | A1 | * | 2/2007 | Prokopenko et al. | 345/506 |
| 2007/0030279 | A1 | * | 2/2007 | Paltashev et al. | 345/506 |
| 2007/0030280 | A1 | * | 2/2007 | Paltashev et al. | 345/506 |
| 2009/0217288 | A1 | * | 8/2009 | Neubauer et al. | 718/105 |

* cited by examiner

*Primary Examiner* — Jennifer N To
(74) *Attorney, Agent, or Firm* — Matthew B. Talpis; Gregory K Goshorn; Greg Goshorn, P.C.

(57) ABSTRACT

Execution units process commands from one or more command queues. Once a command is available on the queue, each unit participating in the execution of the command atomically decrements the command's work groups remaining counter by the work group reservation size and processes a corresponding number of work groups within a work group range. Once all work groups within a range are processed, an execution unit increments a work group processed counter. The unit that increments the work group processed counter to the value stored in a work groups to be executed counter signals completion of the command. Each execution unit that access a command also marks a work group seen counter. Once the work groups processed counter equals the work groups to be executed counter and the work group seen counter equals the number of execution units, the command may be removed or overwritten on the command queue.

20 Claims, 8 Drawing Sheets

MULTI-CORE/THREAD WORK-GROUP COMPUTATION SCHEDULER

FIELD OF DISCLOSURE

The claimed subject matter relates generally to allocation of computer resources and, more specifically, to techniques for the scheduling of both data and task parallel loads in a multi-core processing system.

SUMMARY

Scheduling of a computing system may involve jobs structured for data parallelism or task parallelism or some combination of the two. Data parallel jobs, or loads, are computation in which data may be operated on by multiple units, such as, but not limited to, processors or processing cores, in parallel. An example of this type of processing is performed by a graphics processing unit (GPU) that manipulates video data in which a bit map is separated into regions and each region may be operated on at the same time. Task parallel loads are computation in which multiple units of execution are independently executing different tasks on a set of data in parallel. An example of this type of task is the filtering of data in which a set of data is passed through one filter and the result is passed through a second filter.

Provided are techniques comprising generating a first command queue for queuing commands to an computing device; posting a command to the first command queue, wherein the command includes a plurality of work groups; associate with the command a data structure that identifies the plurality of work groups, a reservation size corresponding to the command, a counter storing a number of work groups and a counter storing the number of work groups remaining to be processed; reserving, by each execution unit of a plurality of execution units, a distinct N-dimensional range of the plurality of work groups wherein the N-dimensional ranges corresponds to the reservation size; processing, by each of the plurality of execution units, the corresponding N-dimensional range; decrementing the counter storing the number of work groups remaining to be processed by the number of work groups each execution unit has processed; repeating the reserving, processing and decrementing until the counter storing the number of work groups remaining to be processed is less than or equal to a value of '0'; and signaling, to indicate a completion of the command, when the counter storing the number of work groups remaining to be processed is less than or equal to a value of '0'.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
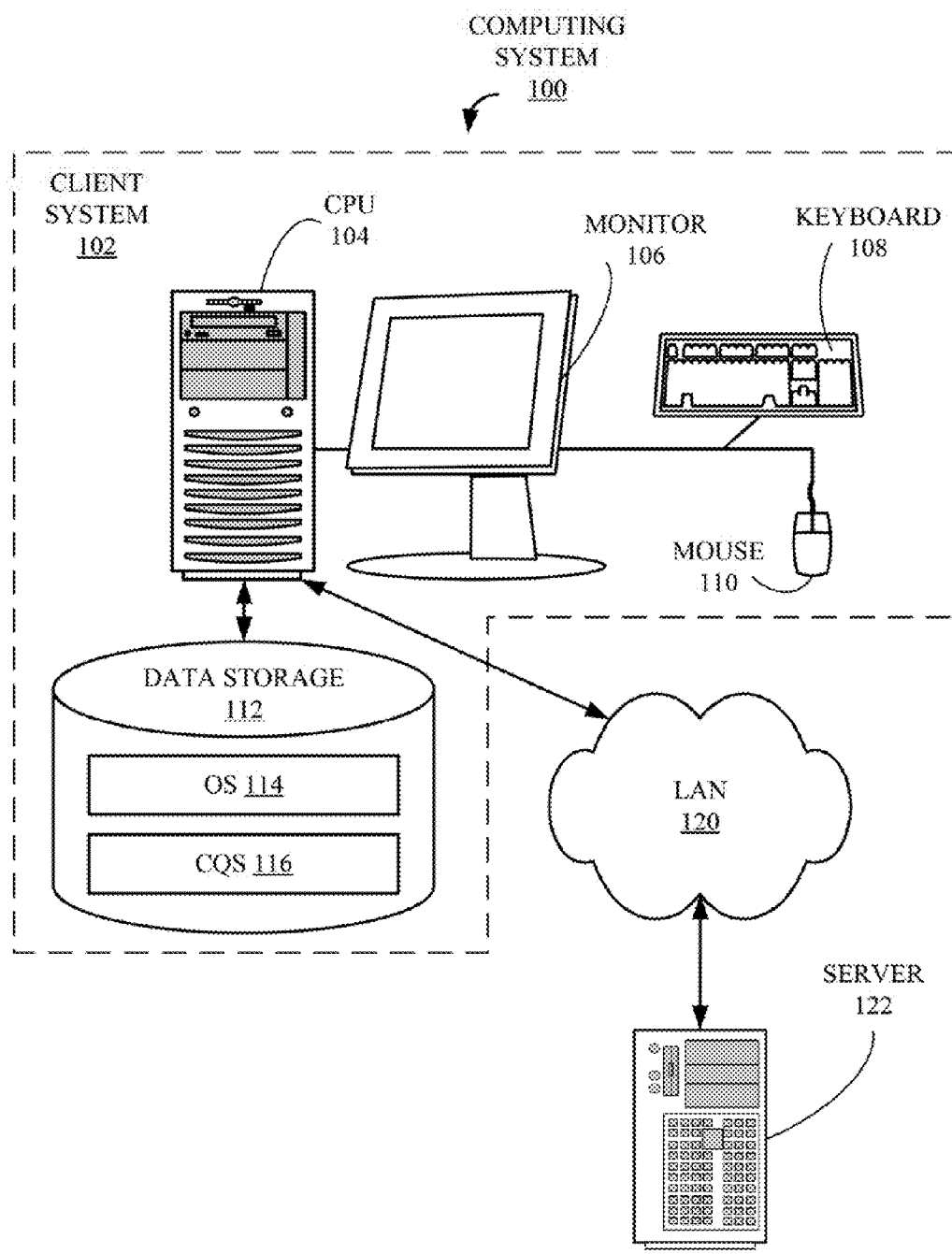
FIG. 1 is one example of a computing system architecture that may implement the claimed subject matter.

Provided are techniques in which an execution command contains the information necessary to efficiently execute and balance work load of a command that may include data or task parallel processing requirements. Each command includes information corresponding to the total number of work groups within the command to be executed, the number of work groups remaining to be computed, the number of work groups already processed, the number of work groups to process at a time (reservation size), the number of execution threads to process in the command and the number of execution threads that have seen the command.

Execution units process the commands from one or more command queues. An execution unit may be anything that can execute a command, including, but not limited to, processing cores, a thread, or a computing system across a network. Each execution unit manages the current location within an assigned queue. Once a command is available on the queue, each unit participating in the execution of the command atomically decrements the command's work groups remaining counter by the work group reservation size and reserves a corresponding number of work groups within a work group range for processing. Once an execution unit has executed the requested work groups, the unit attempts to reserve more. This continues until the total number of work groups have been processed. Once all work groups have been processed, each execution unit increments a work group processed counter. For example, if a particular execution unit processes ten (10) work groups at a time for three (3) times and then determines that all work groups have been processed, the execution unit increments the work group processed counter by thirty (30). The unit that increments the work group processed counter to the value stored in a work groups to be executed counter signals completion of the command.

Each execution unit that access a command also marks a work group seen counter. Once the work groups processed counter equals the work groups to be executed counter and the work group seen counter equals the number of execution units, the command may be removed or overwritten on the command queue.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for efficient queuing of both data parallel and task parallel jobs. The term "programmed method", as used herein, is defined to mean one or more process steps that are presently performed; or, alternatively, one or more process steps that are enabled to be performed at a future point in time. The term 'programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have realized, architectures such as cell broadband engine architecture (CBEA) are designed to provide flexibility but are at a disadvantage because a scheduling model is not built into the hardware. With respect to scheduling that is provided as a software feature, performance is an important issue in order to compete with a hardware scheduler.

Turning now to the figures, FIG. 1 is one example of a computing system architecture 100 that may implement the claimed subject matter. A client system 102 includes a central processing unit (CPU) 104. CPU 104 may include multiple processors (not shown), each of which may include multiple processing cores (see FIG. 2). Those with skill in the computing arts should appreciate the many different configurations possible for CPU 104.

Client system 102 and processor 104 are coupled to a monitor 106, a keyboard 108 and a mouse 110, which together facilitate human interaction with computing system 100 and client system 102. Also included in client system 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing an operating system 114, which controls the operation of client system 102, and an example of a Command Queuing System (CQS) 116 that implements the claimed subject matter. Functionality associated with CQS 116 is described in more detail below in conjunction with FIGS. 2-8.

Client system 102 and CPU 104 are connected to a local area network (LAN) 120, which is also connected to a server computer 122. Although in this example, CPU 104 and server 122 are communicatively coupled via LAN 120, they could also be coupled through any number of communication mediums such as, but not limited to, the Internet (not shown). Further, it should be noted there are many possible computing system configurations that might implement the claimed subject matter, of which computing system 100 is only one simple example.

Figure 2:
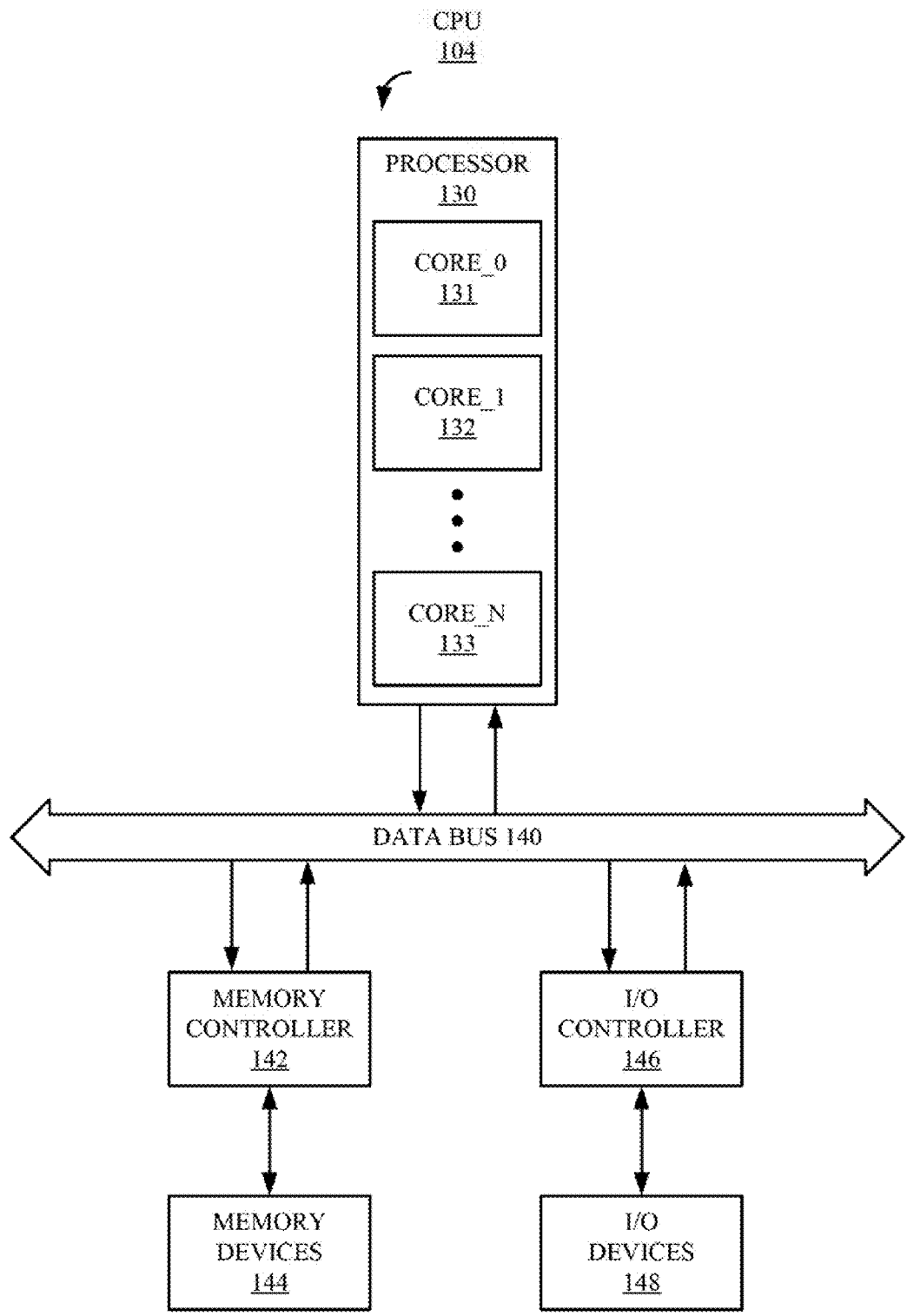
FIG. 2 is a block diagram of an example of a central processing unit, first introduced in FIG. 1.

FIG. 2 is a block diagram of an example of a configuration of CPU 104, first introduced in FIG. 1. CPU 104 includes a processor 130 that includes N execution units, which in this example are processing cores, i.e. a core_0 131, a core_1 132 and so on up to a core_N 133. The exact number of processing cores of processor 130 is not significant; the claimed subject matter works equally well regardless of the number. It should be noted that in addition to processor 130 that may be additional processors but, for the sake of simplicity, only one processor is illustrated. Cores 131-133 are employed throughout the Specification as examples of execution units that are scheduled according to the claimed subject matter. As explained above, an execution unit may be any device that executes a command, including, but not limited to, processing cores, CPUs, thread and even complete computing system.

Processor 130 is communicatively coupled to a data bus 140, which provides a communication path among cores 131-133 and a memory controller 142 and input/output (I/O) controller 146. Memory controller 142 is responsible for controlling memory devices 144 of client system 102 (FIG. 1), such as data storage 112 (FIG. 1). I/O controller is responsible for controlling I/O devices 148, such as monitor 106 (FIG. 1), keyboard 108 (FIG. 1) and mouse 110 (FIG. 1). Those with skill in the art should appreciate that FIG. 2 is a very simple illustration of a typical CPU, which would include many other components that for the sake of simplicity are not shown.

Figure 3:
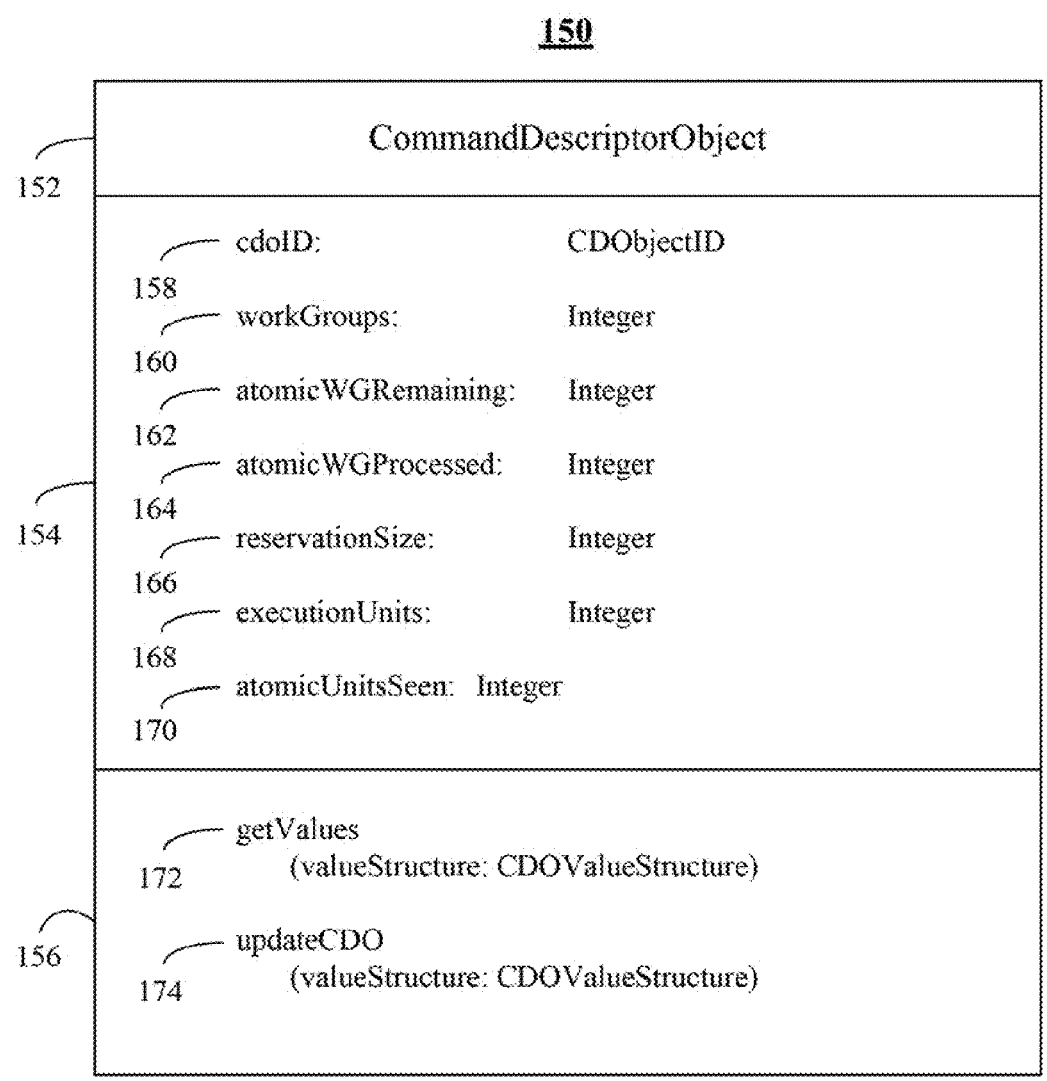
FIG. 3 is an example of a command descriptor memory object that may be employed to implement a command queue according to the claimed subject matter.

FIG. 3 is an example of a command descriptor memory object (CDMO) 150 that may be employed to implement a command queue according to the claimed subject matter. CDMO 150 includes a title section 152, which merely states the name of object 200, i.e. "CommandDescriptorObject," an attribute section 154, which contains memory elements, or attributes, associated with CDMO 150, and a method section 156, which includes functions, or methods, that may be executed in conjunction with CDMO 150. It should be noted that the attributes and methods described are used for the purpose of illustration only. Additional and/or different attributes and methods may be employed to implement the claimed subject matter.

Attribute section 152 includes an "cdoID" attribute 158, a "workGroups" attribute 160, an "atomicWGRemaining" attribute 162, an "atomicWGProcessed" attribute 164, a "reservationSize" attribute 166, an "executionUnits" attribute 168 and an "atomicUnitsSeen" attribute 170.

CdoID attribute 158 is a variable of type CDObjectID that contains a reference to a particular instance of CDMO 150. Each instance of object 150 has a unique value for attribute 158 that allows each instance to be uniquely identified. Work-Groups attribute 160 is a variable of type Integer that stores the total number of work groups to be computed within the corresponding command referenced by the particular instantiation of CDMO 150.

AtomicWGRemaining attribute 162 is a variable of type Integer that stores the number of work groups that remain to be processed. Before processing begins on the corresponding command, attribute 162 stores a value equal to the value of attribute 160. Once processing commences on the corresponding command the value of attribute 162 is equal to the number of work groups that have yet to be assigned to a core for processing. Once processing has completed, attribute 162 is set to a value of less than or equal to '0'. As explained in more detail below in conjunction with FIG. 7, an execution unit that decrements attribute 162 such that the value is less than or equal to '0' knows that the work groups remaining are the last work groups to be processed for the corresponding command and, therefore, may be required to process either an incomplete set of no work groups.

AtomicWGProcessed attribute 164 is a variable of type Integer that stores the number of work groups of the corresponding command that have completed processing. Before processing begins on the corresponding command, attribute 164 stores a value equal to the value of '0' or NULL. Once processing has completed, attribute 164 is equal to the value of attribute 160, indicating that each of the original assigned work groups have completed processing. Attribute 164 is also employed so that the execution unit that increments attribute 164 signals that all work groups have completed. It should be noted that in an alternative embodiment functionality associated with attributes 162 and 164 could be reversed such that 164 may be employed to signal that work groups continued to need processing and attribute 162 may be employed to determine that all work groups have completed.

ReservationSize attribute 166 is a variable of type Integer that stores the number of work groups that each core should be allocated at a single time. Of course, as a command approaches completion, the number of remaining work groups to be processed my be less than the value of attribute 166. ExecutionUnits attribute 168 is a variable of type Integer that stores the number of execution units that are expected to see, i.e. request work groups for processing, a particular command. AtomicUnitsSeen attribute 160 is a variable of type Integer that stores the number of execution threads that have seen the command, either because a particular thread has processed work groups associated with the command or because, when the thread was ready for processing, all work groups had already been allocated.

Method section 156 of CDMO 150 includes two exemplary functions, or methods. Only two methods are illustrated for the sake of simplicity. Those with skill in the programming arts should appreciate that an object such as object 150 would typically include many additional methods including, but not limited to, constructors, destructors, and methods to set and get values for specific attributes.

A "getValues" method 172 is called, for example during a "Determine Set Size" block 312 and a "WGs Remaining?" block 316, both explained in more detail below in conjunction with FIG. 7. Method 172 is called to retrieve the values of attributes stored in an instantiation of CDMO 150. In this example, method 172 is called with one parameter: "value-Structure," a variable of type CDOValueStructure that includes storage space for attributes 154.

An "updateCDO" method 174 is called, for example, during a "Increment # of WGs Completed" block 324, explained in more detail below in conjunction with FIG. 7. Method 174 is called to update attributes 158, 160, 162, 164, 166, 168 and 170 of the corresponding component. In this example, method 174 is called with one parameter: "valueStructure," as explained above, a variable of type CDOValueStructure that included storage space for attributes 154.

It should be understood that CDMO 150 is only one example of a memory object that may be used to implement the claimed subject matter. Other memory objects with fewer, more and/or different attributes and methods may be employed. In addition, there are many ways other than employing object 150 to implement the functionality and data storage of the claimed subject matter. For example, the claimed subject matter may be implemented by means of a computer program in conjunction with a relational database.

Figure 4:
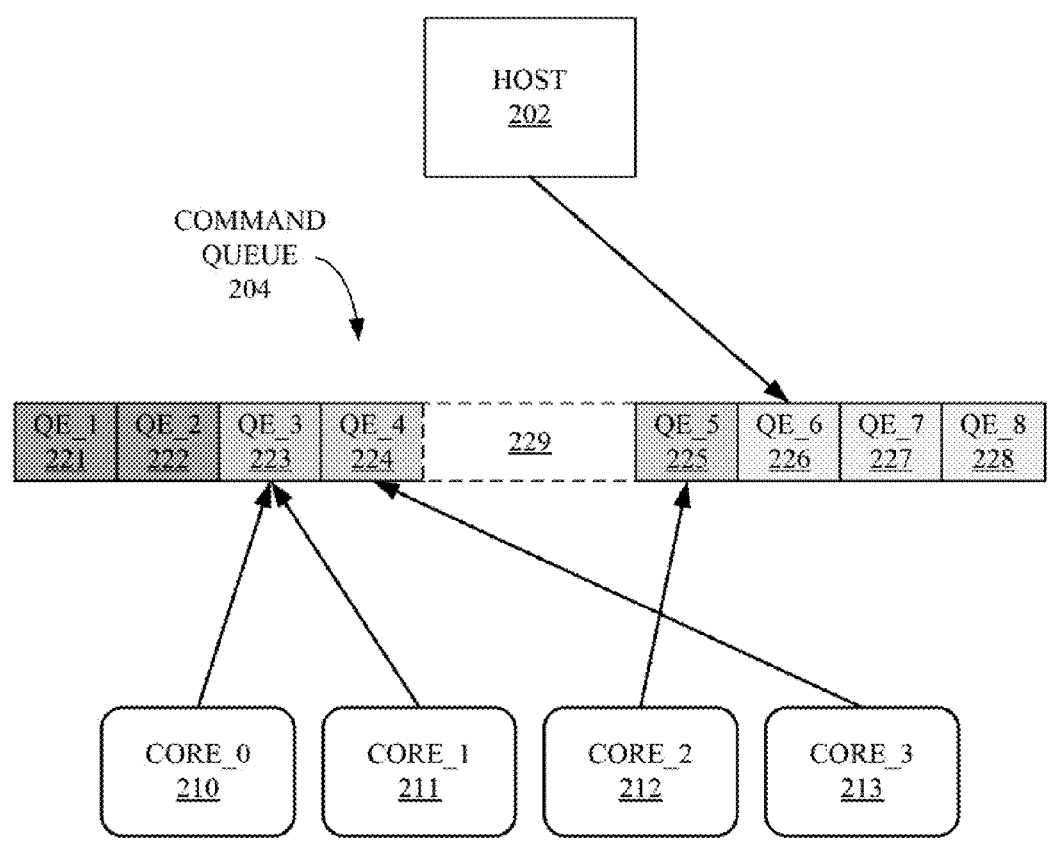
FIG. 4 is a block diagram illustrating examples of a host, command queue, multiple processing cores and relationship among them.

FIG. 4 is a block diagram illustrating examples of a host 202, a command queue 204, a core_0 210, a core_1 211, a core_2 212, a core_3 213 and various examples of relationships among them. It should be noted that command queue 204 is circular. Host 202 may be any command execution device or devices that post commands to the queue such, but not limited to, client system 102 (FIG. 1), server 122 (FIG. 1), processing cores, execution threads, etc. Cores 210-213 may be processing cores associated with host 202 such as cores 130-133 (FIG. 2). If host 202 is assumed to be client system 102, then command queue 204 may be stored on data storage 102 (FIG. 1) or volatile memory (not shown) associated with CPU 104 (FIGS. 1 and 2).

Memory queue 204 is illustrated as containing several queue elements (QEs), specifically a QE_1 221, a QE_2 222, QE_3 223, a QE_4 224, QE_5 225, a QE_6 226, QE_7 227 and a QE_8 228. Shading associated with QEs 221-228 represent various possible states with QEs 221 and 222 representing completed commands, QEs 223-225 representing commands currently not necessarily being processed but not seen by all execution units. QEs 226-228 representing empty, or available, queue slots in command queue 204. A space 229 within command queue 204 merely represents additional QEs that are not currently being processed but may be assumed to be complete because core_2 212 has already proceed past them. In this case, cores 210, 211 and 213 have not yet seen the QEs represented by space 229. Although processing has completed with respect to the QEs associated with space 229, the QEs cannot be overwritten with new commands until "seen" by cores 210, 211 and 213. This prevents cores 210, 211 and 213 from attempting to access a QE which has been overwritten and therefore stores different information that that which is expected.

In this example, host 202 is pointing to the next available queue element slot QE_6 226. Core_0 210 and core_1 211 are illustrated as pointing to, or in the process of executing a command associated with QE_3 223, core_2 222 is illustrated as executing a command associated with QE_5 225 and core_3 213 is illustrated as executing a command associated with QE_4 224. The significance of the various pointers and the execution of commands stored in command queue 204 are explained in more detail below in conjunction with FIGS. 5-8.

It should be noted that an NDR is a command that is made up of multiple dimensions of work groups/items. An NDR, although associated with a particular command may all be contained within a single QE such as QEs 221-228, however that is not necessary. A QE contains a command, which may be, but is not limited to, an NDR, a task or an indication of a queue resize. The disclosed technology also provides for placing a single command with multiple work groups in multiple QEs to enable the interleaving of commands among multiple processing groups (see FIG. 5). The illustration of FIG. 4 may be considered a simplified example that includes only one processing group.

Figure 5:
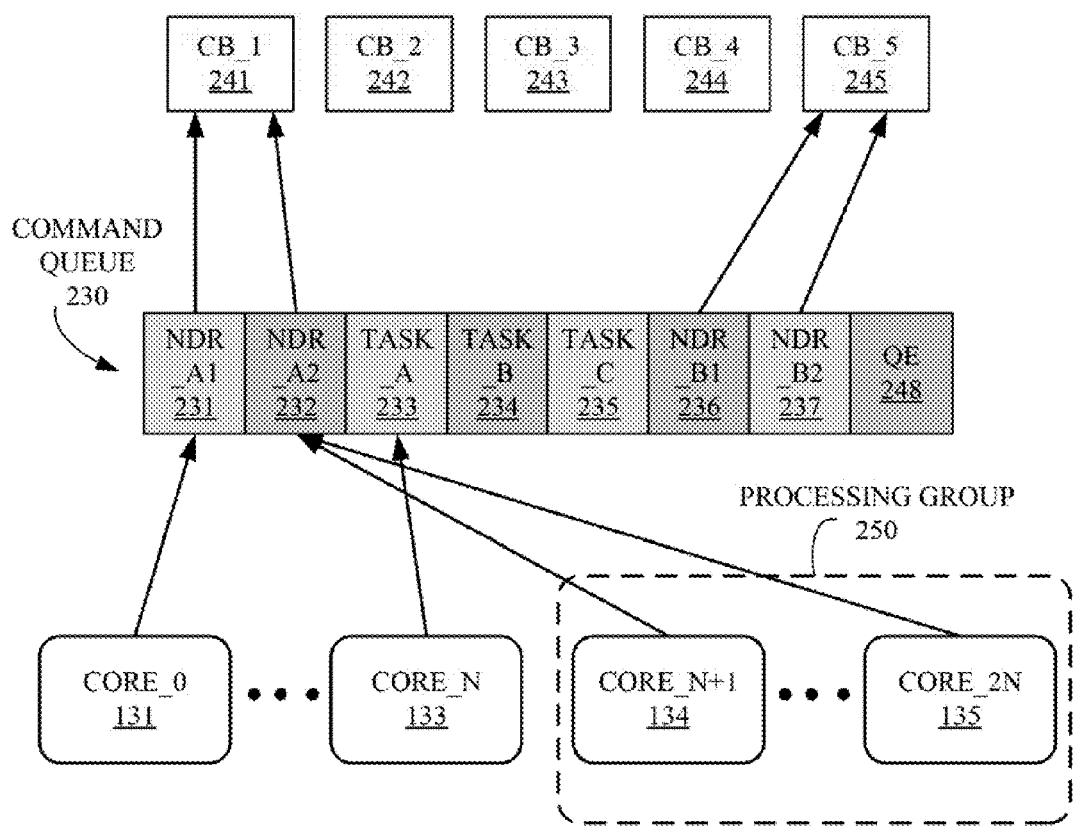
FIG. 5 is a bloc diagram illustrating examples of counter blocks, N-Dimensional Range (NDR) commands, tasks, processing cores and relationship among them.

FIG. 5 is a block diagram illustrating examples of a command queue 230 from a different perspective than command queue 204 of FIG. 4. Specifically, command queue 230 is shown divided in to N-dimension range (NDR) commands and task commands. In other words, a command that is specified as including multiple work groups is divided into one or more N-Dimensional ranges. One particular command is divided into two NDRs, an NDR_A1 231 and an NDR_A2 232. NDR_A1 231 and NDR_A2 232, both represent a single command, thus the shared counter block CB_1 241. One command has two entries in command queue 230 to permit interleaving of commands in queue 230 between processing groups. In FIG. 5, a processing group represented by cores 131-133 is processing odd number entries and processing group 250 is processing even number entries. This division of responsibilities helps alleviate contention over shared task counter blocks. Splitting a single command into two entries, in this example, NDR_A1 231 and NDR_A2 232, enables both processing groups to execute the command. Another command is also divided into two NDRs, an NDR_B1 236 and an NDR_B2 237. In addition, a task command may be considered an NDR with one (1) work group.

Also illustrated are single tasks associated with corresponding commands, i.e. a task_A 233, a task_B 234 and a task_C 235. Each task 233-235 is associated with a corresponding QE. Counter blocks (CBs), specifically a CB_1 241, a CB_2 242, CB_3 243, a CB_4 244 and a CB_5 245, are employed to track execution of commands with each block corresponding to related NDRs. In this example, CB_1 241 is tracking execution of a command associated with NDRs 231 and 232 and CB_5 245 is tracking execution of a command associated with NDRs 236 and 237.

Also included in FIG. 5 are processing cores 131-133 (FIG. 2) as well as additional cores, a core_N+1 134 through a core_2N 135, associated with a processing group 250. Processing group 250 may be an additional processor in CPU 104 (FIGS. 1 and 2) or in another computing device such as server 122 (FIG. 2) communicatively coupled to CPU 104. Although two (2) processing groups are illustrated, the number of processing groups is not limited. Processing groups may consist of processor cores, threads or even a system across a network. Processor grouping may depend upon factors such as performance and/or locality or the elements. In this example, core_0 131 is executing NDR_A1 231, core_N 133 is executing task_A 233, and cores 135 and 135 are processing NDR_A2 232. Processing associated with counter blocks, NDRs, tasks and processing cores is explained in more detail below in conjunction with FIGS. 6 and 7.

Figure 6:
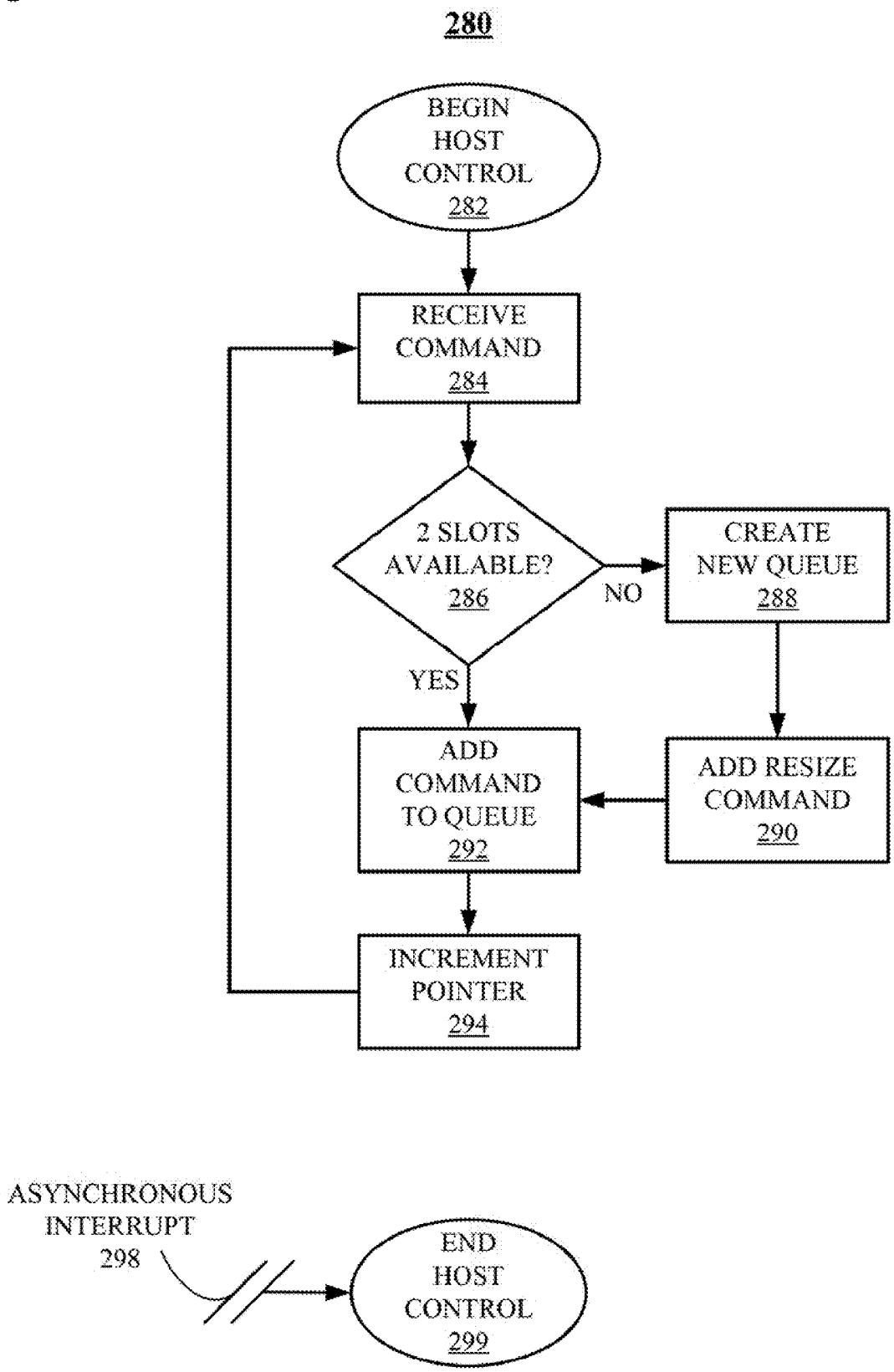
FIG. 6 is a flowchart illustrating an example of a Host Control process.

FIG. 6 is a flowchart illustrating an example of a Host Control process 280. In this example, logic associated with process 280 is stored on data storage 112 (FIG. 1) and executes on CPU 104 (FIGS. 1 and 2) in conjunction with CQS 116 (FIG. 1). Process 280 starts in a "Begin Host Flow" block 282 and proceeds immediately to a "Receive Command" block 284.

During block 284, process 280 receives a command for posting on the command queue, which for the purposes of the following examples is command queue 230. A command may be transmitted from a variety of sources such as, but not limited to, OS 114 (FIG. 1) and any applications (not shown) and utilities (not shown) executing on, in this example, client system 102. In addition, a command may be transmitted from a remote source such as server 122. During a "2 Slots Available?" block 286, process 280 determines whether or not the command queue 230 has at least two (2) available slots. To avoid stalling the command queue host, which for the purposes of this example is host 202 (FIG. 4), command queue 230 is resized whenever less than two (2) entries are available for entry of new commands. By looking ahead, host 202 can determine whether or not command queue 230 has sufficient space to accommodate a new command without forcing a block on the next enqueue.

If less than two (2) blocks are available when request is received to enqueue a new command, process 280 proceeds to a "Create New Queue" block 288 during which a new, larger queue (not shown) is created. If at least two spots are available on command queue 230, one block can be employed to enqueue the command received during block 284, leaving one space to prevent a block on the next command received.

During an "Add Resize Command" block 290, a resize command, along with information necessary for execution units to access the new queue, is inserted as the last remaining spot in the current queue. In this manner, a command queue process (see process 300, FIG. 7) may be notified and take necessary steps to employ the new queue (see 310, FIG. 7). For the sake of continuity during the following description, the new queue will still be referred to as command queue 230. Once the resize command has been noted inserted during block 290 or if, during block 286, process 280 determines that at least two (2) queue spots are available, process 280 proceeds to an "Add command to Queue" block 292. During block 292, the command received during block 284 is added as the first entry in the new queue (from block 290) or inserted in the current command queue 230 (from block 286). During an "Increment Pointer" block 294, process 300 increments the pointer from host 202 to the next available QE.

Finally, process 280 is halted by means of an asynchronous interrupt 298, which passes control to an "End Host Control" block 299 in which process 280 is complete. Interrupt 298 is typically generated when OS 114 or CQS 116 (FIG. 1) of which process 280 is a part is itself halted. During nominal operation, process 280 continuously loops through the blocks 284, 286, 288, 290, 292 and 294 processing commands as they are received.

Figure 7:
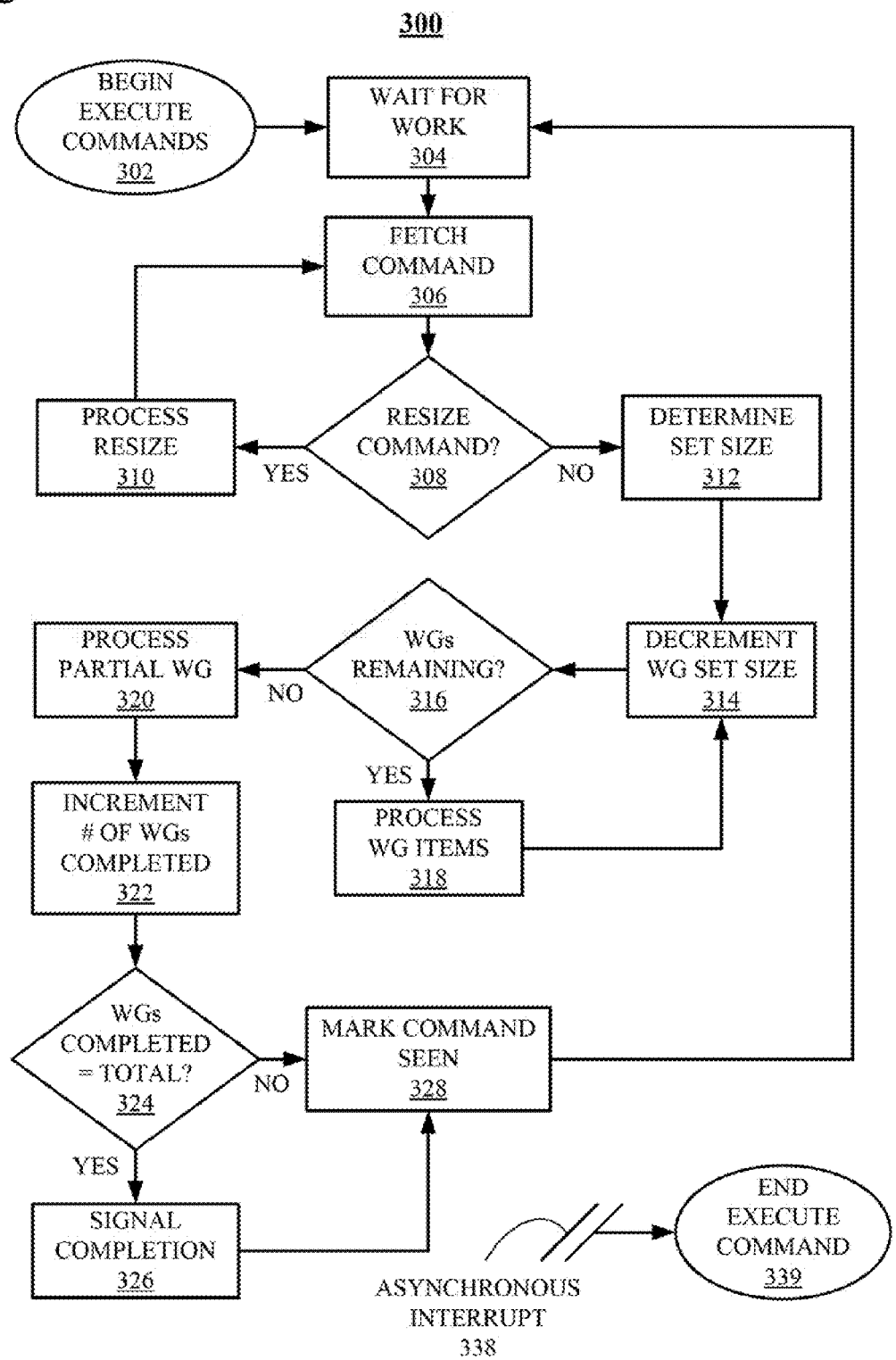
FIG. 7 is a flowchart illustrating an example of an Execute Command process that may be used to implement the claimed subject matter.

FIG. 7 is a flowchart illustrating an example of an Execute Commands process 300 that may be used to implement the claimed subject matter. In this example, logic associated with process 300 is stored on data storage 112 (FIG. 1) and executes on CPU 104 (FIGS. 1 and 2) in conjunction with CQS 116 (FIG. 1).

Process 300 starts in a "Begin Execute Commands" block 302 and proceeds immediately to a "Wait for Work" block 304. During block 304, process 300 is in a suspended state awaiting a signal from CQS 116 that there one or more commands on a command queue such as command queues 204 (FIG. 4) or 230 (FIG. 5). Command queue 230 will be used for the purposes for this description. The mechanism for notifying execution units such as cores 131-135 (FIG. 5) and therefore process 300 that a command is available may vary depending upon system configuration and workload. Hotpolling the state of the next available command provides high efficiency for systems that do not heavily consume resources polling. For example, and SPU unit may perform an atomic poll of an entry of command queue 230 that contains the next command to be processed. On a CPU in which polling consumes valuable computing cycles, a condition variable may be used. Once a signal that a command in on queue 230 is received, process 300 proceeds to a "Fetch Command" block 306 during which the first command in retrieved from the position in command queue 230 that represents the next available command. Information related to the command (see CDMO 150, FIG. 3) is stored in counter blocks such as CBs 241-245 (FIG. 5).

During a "Resize Command?" block 308, process 300 determines whether or not the command fetched during block 306 represents an indication that command queue 230 has been resized (see process 280, FIG. 6). If so, process 300 proceeds to a "Process Resize" block 310 during which processing is executed to employ the new or resized queue rather than the old queue (see FIG. 6). Process 300 then returns to block 306, the next command is fetched from the new queue and processing continues as described above.

If, during block 308, process 300 determines that the next command to be executed is not an indication of a resized command queue 230, control proceeds to a "Determine Set Size" block 312. During block 312, process 300 determines the configured work group size for the corresponding command (see 166 of CDMO 150, FIG. 3). Of course, the command may be a task, which can be considered to have both only one (1) work group and a reservation size of one (1). During a "Decrement work Group (WG) Set Size" block 314, each execution unit associated with the execution of the command fetched during block 306 decrements a variable that stores the number of work groups within the command that still need to be processed (see 162 of CDO 150, FIG. 3). For the purposes of this example execution units 131-135 (FIGS. 2 and 5) are used. Each execution unit 131-135 executes block 314 atomically so that the variable is updated completely by one unit before another unit accesses and decrements the variable. The decremented value provides the corresponding execution unit 131-135 the base of a range of NDRs within a particular command to be executed by the particular unit. In this manner, each execution unit may control the number of work groups it executes from an NDR with minimal host involvement. In other words, commands are divided among execution units such that each execution unit requests work as needed and is fully capable of knowing when to proceed to the next command.

During a "WGs Remaining?" block 316, process 300 determines whether or not any work group units remain to be processed (once the current execution unit has executed), i.e. the value of variable 162 is zero or less as the result of the operation of block 314. If attribute is zero or less and also has an absolute value less than the absolute value of reservationSize 166 (FIG. 3), the execution unit has the last work groups of the command to process and possibly an incomplete set. In this case, process 300 proceeds to a "Process Partial WG" block 320 during which the remaining work groups identified by the base range retrieved during block 314 are processed. If attribute 162 is zero or less and has also an absolute value greater or equal the absolute value of reservationSize 166 (FIG. 3), the execution unit know that all work groups have been processed and proceeds to block 320 but does not process work groups.

If, during block 316, attribute 162 is determined to be greater than zero, process 300 proceeds to a "Process WG Items" block 318. During block 318, the corresponding execution unit 131-133 is responsible for executing the reservation sized work groups starting from the base range of NDR determined during block 314. Process 300 then returns to block 314 during which processing continues as described above.

During an "Increment # of WGs Completed" block 322, each execution unit atomically increments a variable that indicates the total number of work groups completed (see 164, FIG. 3) by the number of work groups the particular execution unit 131-135 processed with respect to the command received during block 306 during iterations through blocks 314, 316, 318 and 320.

During a "WGs Completed=Total?" block 324, each execution unit determines whether or not the number of work groups completed (see 164, FIG. 3) is equal to the number of work groups in the command (see 160, FIG. 3). If so, the corresponding execution unit 131-133 proceeds to a "Signal Completion" block 326. During block 326, the execution unit 131-135 signals CQS 116 that all work groups associated with the command have been processed. In this manner, only the execution unit that finishes the command, signals CQS 116 thus preventing duplicate signals.

In addition to the processing described above, each execution unit 131-135 operating on command queue 230 executes a "Mark Command Seen" block 328. During block 328, each execution unit 131-135 increments a variable that tracks the number of execution units that have seen a particular command (see 170, FIG. 3). Please note that it is not necessary for an execution unit to have actually worked on a particular command to have seen the command, for example if the number of thread assigned to a particular command (see 168, FIG. 3) exceed the number of units actually necessary to complete the command. Once a command has been marked as seen during block 328, each execution unit 133-135 returns to block 304 and processing continues as described above.

Finally, process 300 is halted by means of an asynchronous interrupt 338, which passes control to an "End Execute Commands" block 339 in which process 300 is complete. Interrupt 338 is typically generated when the OS 114 (FIG. 1) or CQS 116 of which process 300 is a part is itself halted. During nominal operation, process 300 continuously loops through the blocks 302, 304, 306, 308, 310, 312, 314, 316, 318, 320, 322, 324, 326 and 328 processing commands as they are received.

Figure 8:
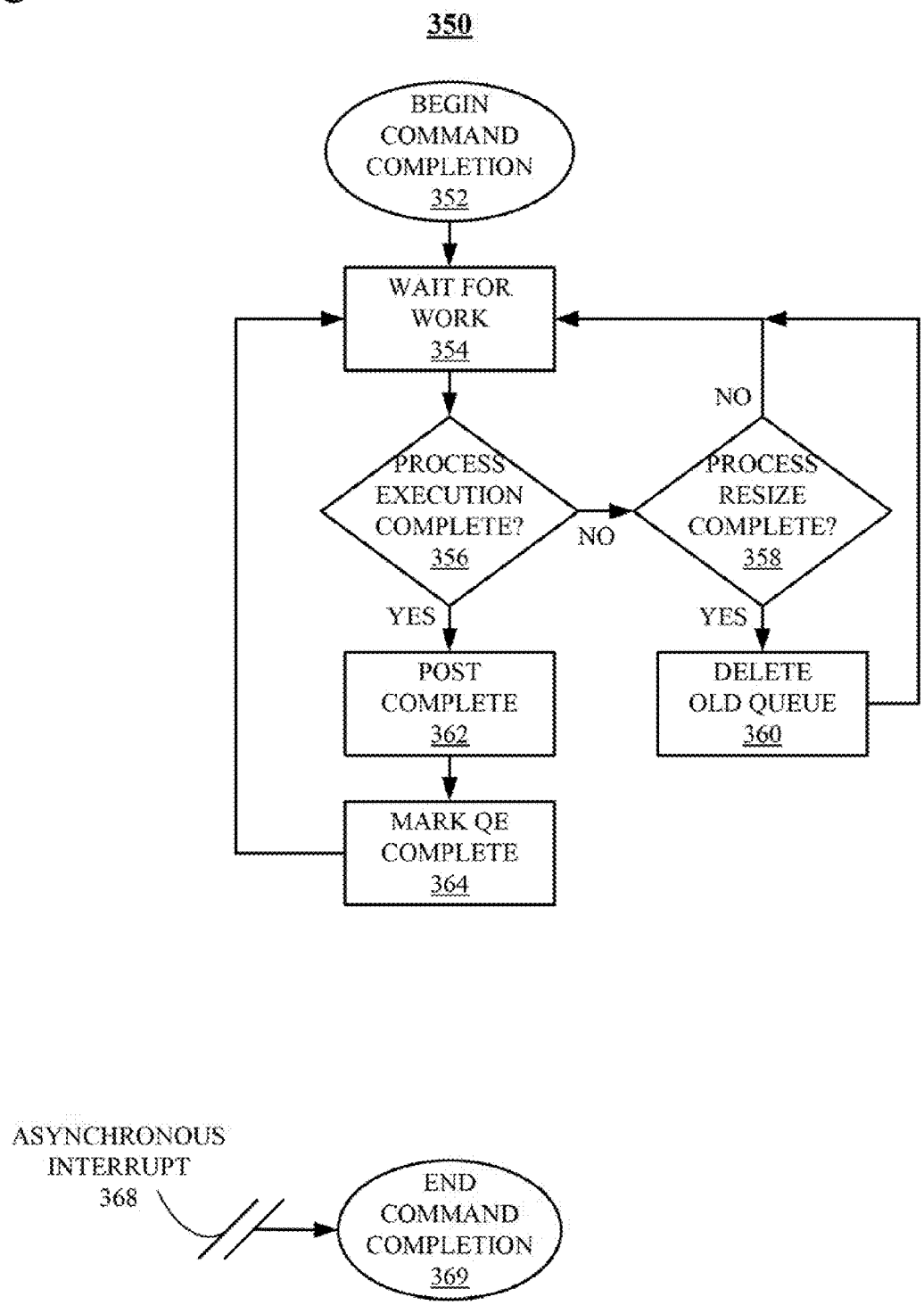
FIG. 8 is a flowchart illustrating an example of a Command Completion process that implements an aspect of the claimed subject matter.

FIG. 8 is a flowchart illustrating an example of a Command Completion process 350 that implements an aspect of the claimed subject matter. In this example, logic associated with process 350 is stored on data storage 112 (FIG. 1) and executes on CPU 104 (FIGS. 1 and 2) in conjunction with CQS 116 (FIG. 1).

Process 350 starts in a "Begin Command Completion" block 352 and proceeds immediately to a "Wait for Work" block 354. During block 354, process 350 is in a suspended state awaiting a signal that the command has executed (see 326, FIG. 7).

Once a signal is received, process 350 proceeds to a "Process Execution Complete" block 356. During block 356, process 350 determines whether or not the command for which the signal received during block 350 represents the completion of a command. If not, process 350 proceeds to a "Process Resize Complete?" block 364 during which process 350 determines whether or not the signal received during block 354 represents an indication that the resize of command queue 230 has been completed. Specifically, a determination is made as to whether each execution unit has seen the resize command and switched over to the resized queue. As explained above in conjunction with FIG. 6, command queue 230 includes both commands and possibly an indication that a resize of command queue 230 has been executed. If the resize command has been seen by all appropriate execution units, process 350 proceeds to a "Delete Old Queue" block 360 during which the queue that has been replaced by a resized queue is deleted.

If process 350 determines during block 356 that the received signal represents a competed command, control proceeds to a "Post Complete" block 362 during which the CQS 116 is notified that the command has been completed by the corresponding execution unit. During a "Mark Queue Entry (QE) Complete" block 364, process 350 marks the corresponding queue entry with an indication that the command has been completed by the corresponding execution unit.

Once the appropriate entry in command queue 230 has been marked completed during blocks 362 or processing has completed with respect to blocks 358 and 360, process 350 returns to block 354 waits for another signal and processing continues as described above. Finally, process 350 is halted by means of an asynchronous interrupt 368, which passes control to an "End Command Completion" block 369 in which process 350 is complete. Interrupt 368 is typically generated when the OS 114 (FIG. 1) or CQS 116 of which process 350 is a part is itself halted. During nominal operation, process 350 continuously loops through the blocks 352, 354, 356, 358, 360, 362 and 364 processing commands as they are received.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
    generating a first command queue for queuing commands to an computing device;

posting a command to the first command queue, wherein the command includes a plurality of work groups;

associate with the command a data structure that identifies the plurality of work groups, a reservation size corresponding to the command, a counter storing a number of work groups and a counter storing the number of work groups remaining to be processed;

reserving, by each execution unit of a plurality of execution units, a distinct N-dimensional range of the plurality of work groups wherein the N-dimensional ranges corresponds to the reservation size;

processing, by each of the plurality of execution units, the corresponding N-dimensional range;

decrementing the counter storing the number of work groups remaining to be processed by the number of work groups each execution unit has processed;

repeating the reserving, processing and decrementing until the counter storing the number of work groups remaining to be processed is less than or equal to a value of '0'; and signaling, to indicate a completion of the command, when the counter storing the number of work groups remaining to be processed is less than or equal to a value of '0'.

2. The method of claim 1, further comprising:

detecting, by one execution unit of the plurality of execution units, that the counter storing the number of work groups remaining to be processed is less than or equal to the value of '0' and that the absolute value of the counter storing the number of work groups remaining to be processed is less than or equal to the absolute value of the reservation size;

wherein the signaling is executed only by the one execution unit.

3. The method of claim 1, wherein the data structure also includes a counter storing a number of execution units that are expected to see the command and a counter storing a number of execution units that have seen the command, the method further comprising releasing an entry corresponding to the command from the first command queue when both the counter storing the number of work groups remaining to be processed is less than or equal to '0' and the counter storing the number of execution units that have seen the command is equal to the counter storing the number of execution units that are expected to see the command.

4. The method of claim 1, wherein each execution unit of the plurality of execution units may be any computing device that executes a command, including a processing core, a processor, a processing thread and a complete computing system.

5. The method of claim 1, further comprising:

determining whether or not there are two available slots for entry of an incoming command in the command queue;

if it is determined that there is at least two available slots for entry of the incoming command in the command queue, entering the incoming command in the command queue; and if it is determined that there is not at least two available slots for entry of the incoming command in the first command queue, creating a second command queue; and substituting the second command queue for the first command queue.

6. The method of claim 5, the substituting comprising:

entering a indication of a queue resizing in the first queue;
entering the incoming command into the second command queue; and replacing the first queue by the second queue when the indication of the queue resizing is detected in the course of executing commands from the first queue.

7. The method of claim 6, further comprising deleting the first queue once the substituting is complete.

8. An apparatus, comprising:

a processor;

a physical memory coupled to the processor;

a plurality of execution units; and logic, stored on the memory and executed on the processor, for:

generating a first command queue for queuing commands to the execution units;

posting a command to the first command queue, wherein the command includes a plurality of work groups;

associate with the command a data structure that identifies the plurality of work groups, a reservation size corresponding to the command, a counter storing a number of work groups, a counter storing the number of work groups remaining to be processed and a counter storing the number of work groups that have been processed;

reserving, by each execution unit of the plurality of execution units, a distinct N-dimensional range of the plurality of work groups wherein the N-dimensional ranges corresponds to the reservation size;

processing, by each of the plurality of execution units, the corresponding N-dimensional range;

decrementing the counter storing the number of work groups remaining to be processed by the number of work groups each execution unit has reserved;

incrementing the counter storing the number of work groups that have been processed by the number of work groups each execution has processed;

repeating the reserving, processing and decrementing until the counter storing the number of work groups remaining to be processed is less than or equal to a value of '0'; and signaling, to indicate a completion of the command, when the counter storing the number of work groups that have been processed is equal to counter storing the number of work groups.

9. The apparatus of claim 8, the logic further comprising logic for:

detecting, by one execution unit of the plurality of execution units, that the counter storing the number of work groups remaining to be processed is less than or equal to the value of '0' and that the absolute value of the counter storing the number of work groups remaining to be processed is less than or equal to the absolute value of the reservation size; and processing by the one execution unit any remaining work groups.

10. The apparatus of claim 8, wherein the data structure also includes a counter storing a number of execution units that are expected to see the command and a counter storing a number of execution units that have seen the command, the method further comprising releasing an entry corresponding to the command from the first command queue when both the counter storing the number of work groups that have been processed is equal to counter storing the number of work groups and the counter storing the number of execution units that have seen the command is equal to the counter storing the number of execution units that are expected to see the command.

11. The apparatus of claim 8, wherein each execution unit of the plurality of execution units may be any computing device that executes a command, including a processing core, a processor, a processing thread and a complete computing system.

12. The apparatus of claim 8, the logic further comprising logic for:
   determining whether or not there are two available slots for entry of an incoming command in the command queue;
   if it is determined that there is at least two available slots for entry of the incoming command in the command queue, entering the incoming command in the command queue; and
   if it is determined that there is not at least two available slots for entry of the incoming command in the first command queue, creating a second command queue; and
   substituting the second command queue for the first command queue.

13. The apparatus of claim 12, the logic for substituting comprising logic for:
   entering a indication of a queue resizing in the first queue;
   entering the incoming command into the second command queue; and
   replacing the first queue by the second queue when the indication of the queue resizing is detected in the course of executing commands from the first queue.

14. The apparatus of claim 13, further comprising deleting the first queue once the substituting is complete.

15. A computer programming product, comprising:
   a physical memory;
   logic, stored on the memory for execution on a processor, for:
      generating a first command queue for queuing commands to a plurality of execution units;
      posting a command to the first command queue, wherein the command includes a plurality of work groups;
      associate with the command a data structure that identifies the plurality of work groups, a reservation size corresponding to the command, a counter storing a number of work groups, a counter storing the number of work groups remaining to be processed and a counter storing the number of work groups that have been processed;
      reserving, by each execution unit of the plurality of execution units, a distinct N-dimensional range of the plurality of work groups wherein the N-dimensional ranges corresponds to the reservation size;
      processing, by each of the plurality of execution units, the corresponding N-dimensional range;
      decrementing the counter storing the number of work groups remaining to be processed by the number of work groups each execution unit has reserved;
      incrementing the counter storing the number of work groups that have been processed by the number of work groups each execution has processed;
      repeating the reserving, processing and decrementing until the counter storing the number of work groups remaining to be processed is less than or equal to a value of '0'; and
      signaling, to indicate a completion of the command, when the counter storing the number of work groups that have been processed is equal to counter storing the number of work groups.

16. The computer programming product of claim 15, the logic further comprising logic for:
   detecting, by one execution unit of the plurality of execution units, that the counter storing the number of work groups remaining to be processed is less than or equal to the value of '0' and that the absolute value of the counter storing the number of work groups remaining to be processed is less than or equal to the absolute value of the reservation size; and
   processing by the one execution unit any remaining work groups.

17. The computer programming product of claim 15, wherein the data structure also includes a counter storing a number of execution units that are expected to see the command and a counter storing a number of execution units that have seen the command, the method further comprising releasing an entry corresponding to the command from the first command queue when both the counter storing the number of work groups that have been processed is equal to counter storing the number of work groups and the counter storing the number of execution units that have seen the command is equal to the counter storing the number of execution units that are expected to see the command.

18. The computer programming product of claim 15, wherein each execution unit of the plurality of execution units may be any computing device that executes a command, including a processing core, a processor, a processing thread and a complete computing system.

19. The computer programming product of claim 15, the logic further comprising logic for:
   determining whether or not there are two available slots for entry of an incoming command in the command queue;
   if it is determined that there is at least two available slots for entry of the incoming command in the command queue, entering the incoming command in the command queue; and
   if it is determined that there is not at least two available slots for entry of the incoming command in the first command queue, creating a second command queue; and
   substituting the second command queue for the first command queue.

20. The computer programming product of claim 19, the logic for substituting comprising logic for:
   entering a indication of a queue resizing in the first queue;
   entering the incoming command into the second command queue; and
   replacing the first queue by the second queue when the indication of the queue resizing is detected in the course of executing commands from the first queue.

* * * * *